United States Patent [19]
Karinsky et al.

[11] 4,408,971
[45] Oct. 11, 1983

[54] GRANULATION APPARATUS

[76] Inventors: Viktor N. Karinsky, bulvar Novoselovoi, 10, kv. 43, Odintsovo Moskovskoi oblasti; Viktor T. Musienko, ulitsa Molodezhnaya, 4, kv. 286; Sergei G. Glazunov, ulitsa Bakinskaya, 29, kv. 90, both of Moscow, all of U.S.S.R.

[21] Appl. No.: 890,501

[22] Filed: Mar. 27, 1978

[51] Int. Cl.³ .............................................. B01J 2/04
[52] U.S. Cl. .................................................... 425/8
[58] Field of Search ........................................ 425/8, 6

[56] References Cited

U.S. PATENT DOCUMENTS

| | | | |
|---|---|---|---|
| 3,099,041 | 7/1963 | Kaufmann | 425/8 |
| 3,752,610 | 8/1973 | Glazonov et al. | 425/6 |
| 3,784,656 | 1/1974 | Kaufmann | 264/10 |

Primary Examiner—James R. Hall
Attorney, Agent, or Firm—Burgess, Ryan & Wayne

[57] ABSTRACT

A rod billet is melted by using a low-temperature plasma jet generator built into a lid of a melting chamber. The plasma jet generator can be oriented at different angles θ from 0° to 70°. The plasma jet's axis can be displaced, parallel to its original position at the center of the end face of the billet being melted, towards the periphery of that end face along its radius. These features account for an increased output and a better uniformity of granules.

13 Claims, 8 Drawing Figures

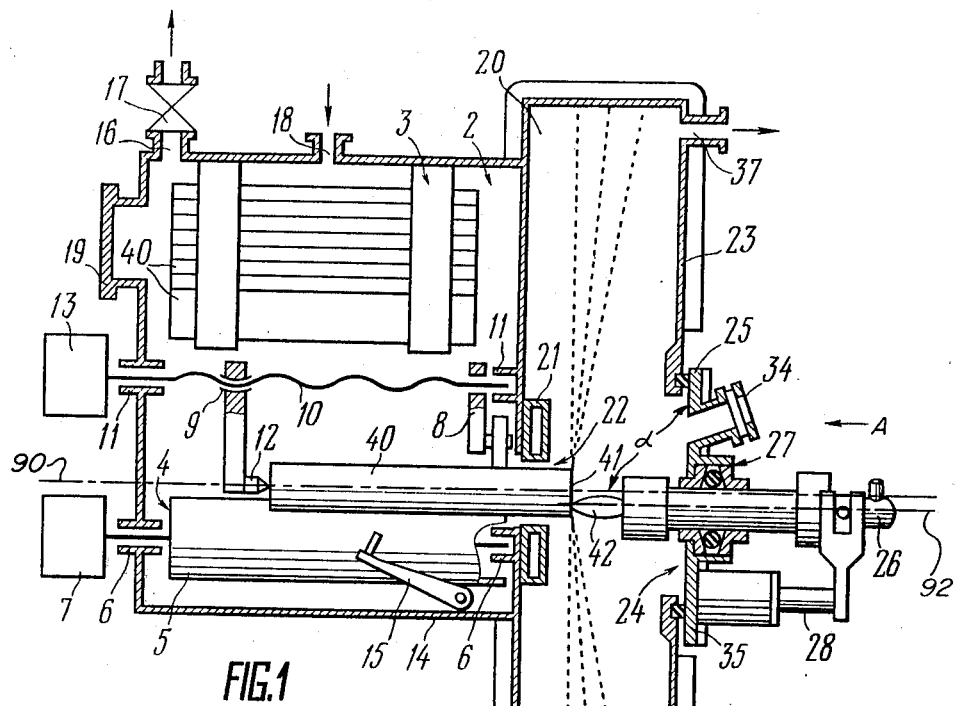
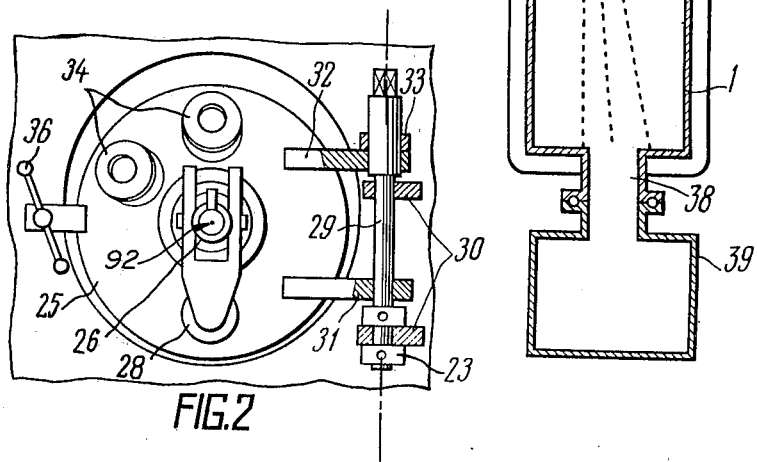

GRANULATION APPARATUS

BACKGROUND OF THE INVENTION

1. Field of the Application

The present invention relates to powder metallurgy and, more particularly, to methods and apparatus for producing globular powders or granules from meltable materials which may be both metallic and nonmetallic.

2. Description of the Prior Art

There are known methods and apparatus for producing granules of metals and alloys by melting the end of a fast-rotating rod-type billet with the use of an electric heat source, for example, an electron beam. The centrifugal forces spray the molten metal inside a sealed chamber so that the molten metal solidifies into spherical particles whose size is determined by the density of the metal, the diameter and the rotation speed of the billet (cf. Italian Patent No. 712,814, Cl. B22 d, of 1966 and Federal Republic of Germany Pat. No. 1,291,842, Cl. 21h 16/60, of 1966).

In the United States, a common type of an apparatus for producing metal granules is the one that comprises a collet means for clamping a cylinder-shaped billet to be melted, a mechanism for rotating the billet and moving it in the longitudinal direction, and a melting chamber filled with an inert gas and accommodating a nonconsumble electrode; finally, the apparatus comprises wiring and busbar means to connect the collet means and the nonconsumable electrode to a power source (cf. U.S. Pat. No. 3,099,041, Cl. 425-8 of 1963). An electric arc is produced between the nonconsumable electrode and the end of the rotating billet. The arc melts the billet's end; the molten metal is sprayed by the centrifugal forces and particles of metal solidify in the inert gas inside the melting chamber.

The foregoing devices and apparatus all have a limited output, the main reason for this being that it is extremely difficult to introduce a new billet into the melting chamber without unsealing that chamber. In addition, the billet diameter is limited, being determined by the relatively small area of the heat-affected zone. With a cross-sectional area of the billet several times greater than the area of the heat-affected zone, the end of the billet cannot be heated uniformly. As a result, only the center of the billet is melted and sprayed, whereas at the periphery the metal only reaches the plastic state to be torn by the centrifugal forces into large shapeless lumps. The output of good granules is thus sharply reduced.

The closest prototype of the present invention, with regard to its technical features and positive effect, is the granulation device developed in the Soviet Union and patented in a number of countries (cf. U.S. Pat. No. 3,752,610, Cl. 425-6, of 1973).

The latter device comprises a sealed round chamber, its axis extending horizontally. On one side, the chamber is provided with a round opening for a billet, which opening is coaxial with the chamber. On the other side, the chamber is provided with a lid into which there is built a heat source. The latter is a nonconsumable tungsten electrode arranged coaxially with the chamber. The device further includes a billet rotating mechanism, composed of two synchronously rotating horizontal rolls and arranged outside the chamber. The axes of the rolls are parallel to the axis of the chamber. Arranged above the rolls is a screw-type mechanism intended to drive a billet between the rolls and through the round hole into the chamber. The apparatus further includes a charging means composed of a tray and a revolving drum, a brush-type lead to the rotating billet, a power source to produce an electric arc between the rotating billet and the nonconsumable electrode, and other mechanisms and components.

A batch of billets is loaded in the charging means. The chamber is evacuated and filled with an inert gas. The billets are fed one by one to the melting zone of the chamber to be melted by the electric arc produced between the nonconsumable electrode and the rotating billet. The centrifugal forces break the molten metal into small particles which crystallize as they fly from the billet to the lateral walls of the chamber. The granules thus produced accumulate at the bottom of the chamber; the unmelted part of the billet is also dropped to the bottom. Unlike the American apparatus described above (cf. U.S. Pat. No. 3,099,041, Cl. 425-8), the apparatus under review is quite economical because the entire contents of the charging means can be processed without unsealing the chamber. That notwithstanding, this advanced apparatus (cf. U.S. Pat. No. 3,752,610, Cl. 425-6) is not free from some of the disadvantages typical of all conventional devices, such as a relatively limited output or limitations imposed on billet diameters.

Furthermore, the coaxial arrangement of the nonconsumable electrode and the rotating billet makes maintenance difficult. For example, in order to push the unmelted part of a billet through the round opening into the chamber, one must first use a special mechanism to move aside the heat source. It is difficult to observe the granulation process because the sight glasses are arranged at an angle to the axis of the rotating billet.

Besides, some of the brush material, which is normally a rapidly wearing material, such as graphite or copper, is caught by the granules, which affects the purity of the product.

Finally, none of the above apparatus, wherein an electric arc or electronic beam are used to melt a rotating billet, can be used to granulate non-conducting materials.

SUMMARY OF THE INVENTION

It is an object of the present invention to increase the output of granulation devices by increasing the maximum permissible diameter of billets, as well as increasing the yield of good granules through a more uniform heat distribution over the billet's end being melted.

It is another objecct of the invention to improve the purity of granules and make granulation devices capable of processing nonconducting materials through making it unnecessary to supply current to rotating billets.

It is still another object of the invention to provide a granulation method which would make it possible to increase the output, quality and uniformity of granules, as well as raise the percentage of good granules.

It is yet another object of the invention to provide an apparatus for effecting the foregoing method of granulation, which would make it possible to increase the maximum permissible diameter of billets.

It is a further object of the invention to provide a granulation apparatus which would be easier to operate and service than conventional devices.

It is a further object of the invention to modify the above-mentioned advanced granulation apparatus in such a way as to improve its reliability without resorting to costly alterations in the design of that device.

The foregoing and other objects of the present invention are attained by providing a method for producing granules from a rod billet, comprising melting the end face of the free end of the billet by using a concentrated heat source, rotating the rod billet about its longitudinal axis and moving the billet along that axis as the billet's free end melts, so that molten particles of the billet are sprayed and solidify in the form of granules; the method according to the invention is characterized in that the direction of the concentrated heat flux is varied with respect to the longitudinal axis of the billet at an angle $\theta$ of from 0° to 70°, and in that the axis of the concentrated heat flux is simultaneously displaced parallel to its original position at the center of the billet's end face as far as the periphery of that end face along its radius.

When compared to conventional methods, the method of this invention makes it possible to increase the output of good-quality spherical granules to as high as 97 percent.

The method further makes it possible to increase the efficiency of the granulation process two- or three-fold by increasing the billet diameter.

The method makes it possible to improve the granulometric uniformity by reducing variations in the granule sizes.

Finally, the method makes it possible to improve the purity of the end product by dispensing with rapidly wearing brush-type means for supplying current to the rotating billet.

The present invention further consists in providing a granulation apparatus comprising a sealed chamber with a lid on one side of said chamber, which lid has a built-in concentrated heat source, whereas on the opposite side said chamber has an opening for feeding the free end of a billet into that chamber, the apparatus further including mechanisms for rotating the billet around its longitudinal axis matched with the axis of the chamber, as well as for feeding the billet into the chamber along that axis, the apparatus being characterized by that the lid of the chamber is shaped as a conical funnel arranged coaxially with the opening for feeding the billet into the chamber and expanding towards that opening, the concentrated heat source being built into the inclined lateral surface of the conical funnel, whereas arranged at the apex of the conical funnel is a sight glass located opposite to the end face of the billet being melted, the lid being arranged so that the concentrated heat source is displaceable parallel with the axis of that source.

The apparatus of this invention features an increased efficiency because it can handle billets of greater diameters than conventional apparatus.

The apparatus of this invention is easier to service that conventional devices.

According to a preferred embodiment of the present invention, the concentrated heat source is a low-temperature plasma jet generator.

The above feature makes it possible to granulate not only metallic, but also nonmetallic meltable materials, such as oxides and carbides.

The apparatus of this invention features a simpler design and an improved reliability because, first, it dispenses with the complicated brush-type means for supplying current to the rotating billet and, second, it makes it possible to reduce the rotating speed of the billet, while additionally accelerating particles of molten metal by the velocity head of the plasma jet.

According to another preferred embodiment of the invention, the graulation apparatus is characterized by that the chamber's lid is shaped as a conical funnel arranged coaxially with the opening for feeding the billet into said chamber and expanding towards that opening, the sight glass being arranged at the apex of the conical funnel, whereas the concentrated heat source is built into the inclined lateral surface of the lid. This is one of the optimum embodiments of the device.

BRIEF DESCRIPTION OF THE ATTACHED DRAWINGS

Other objects and advantages of the present invention will become more apparent from the following detailed description of preferred embodiments thereof to be read in conjunction with the accompanying drawings, wherein:

FIG. 1 is an elevational view partly in cross-section of a granulation apparatus with a flat lid;

FIG. 2 is an elevational view partly in cross-section of the lid with a heat source, taken in the direction of arrow A;

DETAILED DESCRIPTION OF THE INVENTION

Figure 3:
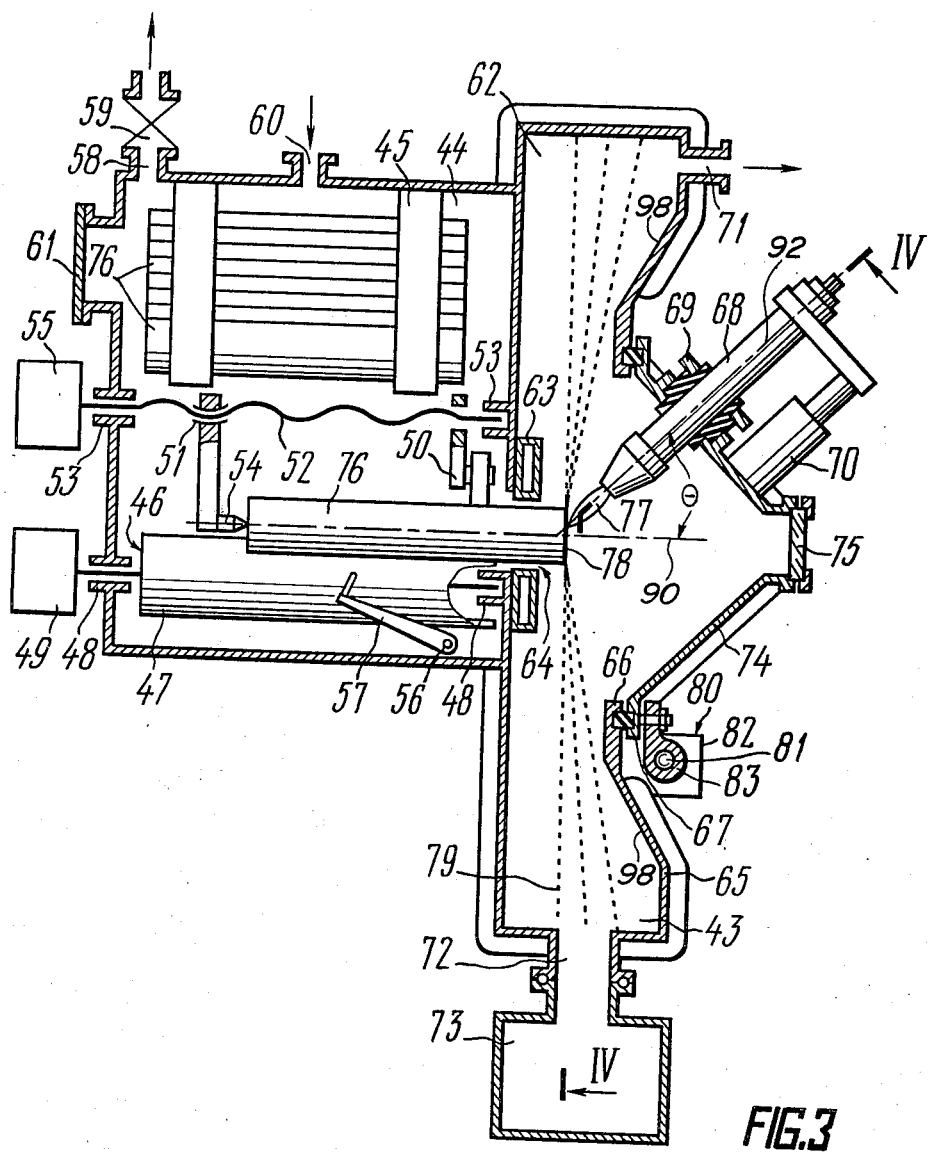
FIG. 3 is an elevational view partly in cross-section of a granulation apparatus with a cone-shaped lid.

Referring to the attached drawings, the granulation apparatus of the present invention comprises a cylindrical chamber 1 with a horizontally extending axis 90. The chamber 1 includes a charging compartment 2 which accommodates a magazine 3, for example, of the cassette type, intended to hold a batch of billets and feed them one by one into the chamber 1 for processing. Arranged below the magazine 3 is a billet rotating mechanism 4 composed of two rolls 5 arranged horizontally and parallel to each other and secured in supports 6. The clearance between the rolls 5 is less than the billet diameter.

The rolls 5 are coupled to a drive 7 which rotates both rolls 5 at equal speeds and in the same direction. Arranged in the vertical plane extending between the rolls 5 (in the plane of FIG. 1) are a roller 8 intended to press a billet against the rolls 5, and a mechanism 9 for moving a billet in the longitudinal direction. The mechanism 9 includes a drive screw 11, a pusher 12 and a drive 13. Arranged in the same plane and mounted on an axle 14 located below the rolls 5 and extending at a perpendicular to them is a pusher 15 intended to remove the unmelted part of a billet. The charging compartment 2 further includes a vacuum line 16 with a check valve 17, intended to evacuate air from the chamber 1, as well as an opening 18 for introducing gas into the chamber 1, a hatch 19 for placing billets in the magazine 3 and other auxiliary systems (not shown) necessary for proper functioning of the mechanisms inside the chamber 1.

A melting compartment 20 of the sealed chamber 1 has water-cooled walls and is separated from the charging compartment 2 by a water-cooled diaphragm 21 provided with an opening 22 for the billet.

The diameter of the opening 22 is 1.02 to 1.08 of the billet diameter. To process billets of different diameters, it is necessary to have a set of interchangeable diaphragms 21 with the diameters of the openings 22 corresponding to those of the billets. Provided in a front wall 23 of the melting compartment 20 is a hatch 24 covered by a detachable lid 25. The hatch 24 is used to clean the inside of the chamber 1 and replace the diaphragms 21. Mounted on the lid 25 is a plasma generator 26 having an axis 92 which is an indirect-action cylindrical arc plasmatron introduced into the chamber 1 through a seal 27. Preferably, the seal 27 should be of the ball type (not shown) for a possible deviation of the axis 92 of the plasma generator 26 from that of the opening 22 by an angle $\nu$ of $\pm 20°$. The plasma generator 26 in FIG. 1 and FIG. 2 is arranged horizontally and coupled to a mechanism 28 mounted on the lid 25 and intended to move the plasma generator 26 along the axis of the chamber 1.

Figure 5:
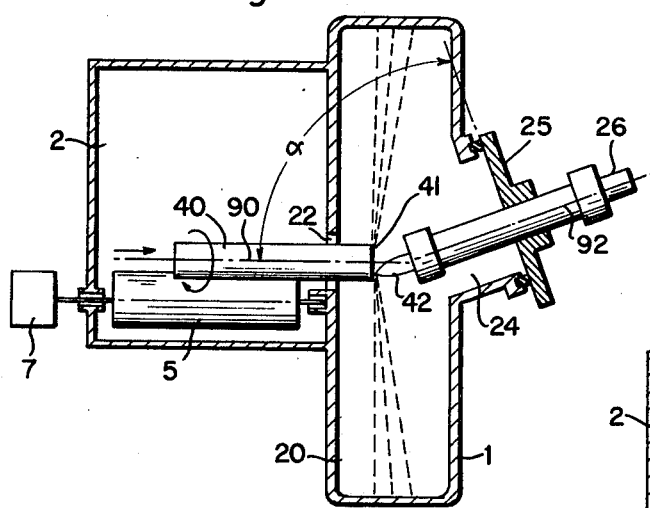
FIG. 5 is a diagrammatic illustration of the apparatus of FIG. 1 with the lid mounted at an angle $\alpha$ of 70° to the axis of the chamber.
Figure 6:
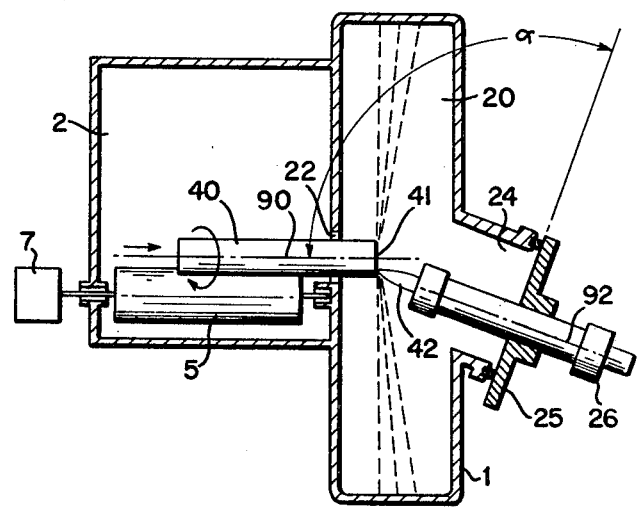
FIG. 6 is a diagrammatic illustration of the apparatus of FIG. 1 with the lid mounted at an angle $\alpha$ of 110° to the axis of the chamber.

Mounted on the front wall 23 of the chamber 1 at an angle $\alpha$ of 70° to 110° to its axis (in FIGS. 1 and 2 the angle $\alpha$ is 90°) is a guide rod 29 pivotably connected to hinges 30 mounted on the chamber 1. The rod 29 is coupled to the lid 26 by means of two hinges 31 and 32, forming a pivotable pair with the lower hinge 31 and a screw pair with the upper hinge 32. Thus as the rod 29 rotates, the lid 25 moves along the axis of the rod 29; according to FIGS. 1 and 2, the lid 25 moves at an angle $\alpha$ perpendicular (90°) to the rotation axis of the billet. At the same time the rod 29 serves as an axle about which the lid 25 swivels when the hatch 24 is opened. A lock nut 33 limits the displacement of the lid 25 with respect to the rod 29 and, consequently, with respect to the axis of the chamber 1. The lid 25 of the chamber 1 is water-cooled and provided with inspection windows 34. A seal 35 and a clamping means 36 provide for an airtight joint between the hatch 24 and the detachable lid 25. In the direction parallel to the rod 29, the size of the lid 25 must be greater than the cross-sectional size of the hatch 24 by the length of displacement of the lid 25 along the rod 29. FIG. 5 and FIG. 6 illustrate an arrangement of the present invention wherein the angle $\alpha$ is 70° and 110° respectively.

In its upper part, the melting compartment 20 has an opening 37 for the removal of excess gas from the chamber 1; in its lower part the melting compartment 20 is provided with an opening 38 communicating with a detachable container 39 which serves to accumulate granules.

Apart from the foregoing units and mechanisms, the apparatus according to the invention is provided with power sources (not shown), vacuum pumps (not shown), a system for the supply, purification and circulation of inert gas (not shown), automatic control means (not shown) and other means necessary for normal operation of the device (not shown), in FIGS. 1 and 2.

The granulation apparatus of the present invention operates as follows.

Cylinder-shaped billets 40 are placed through the hatch 19 in the magazine 3. One of the billets 40 is placed on the rolls 5. The roller 8 presses this billet 40 against the rolls 5 from above, while the pusher 12 exerts pressure on it from the rear. The chamber 1 is sealed and evacuated through the line 16. The valve 17 is then closed and the chamber 1 is filled with an inert gas through the opening 18. The drives 7 and 13 are brought into play, and the billet 40 is introduced through the opening 22 into the melting compartment 20 so that an end 41 to be melted is spaced from the wall of the diaphragm 21 at a distance equal to 0.5 to 1.5 of the diameter of the billet 40. The plasma jet generator 26 is switched on, and its plasma jet 42 is directed at the end face of the end 41 of the billet 40 to heat it to the melting point of the material of the billet 40. The peripheral speed of the rotating billet 40 is 10 to 35 meters per second; the greater the rotation speed of the billet 40, the lesser the diameter of the granules produced.

The centrifugal forces resulting from the rotation of the billet 40 about its longitudinal axis tear the molten metal from the end 41 of the billet 40; the molten metal is thus uniformly sprayed in the radial direction inside the melting compartment 20. The inert gas pressure in the chamber 1 is maintained at a level sufficient for cooling and complete solidification of particles of molten metal in the course of their flight from the end 41 of the billet 40 to the lateral wall of the chamber 1. It is best to maintain an excess pressure in the chamber 1 so as to avoid penetration of air into the chamber 1 through possible leaks and movable joints. In such a case, the gas, which is continuously supplied to the chamber 1 with the plasma jet 42, is let out through the opening 37. It is advisable that the outlet gas should be directed from the opening 37 to a special compressor and fed again to the low-temperature plasma generator 26. The speed of the mechanism 9 for moving the billet in the longitudinal direction is selected so as to ensure uniform heating of the end 41 of the billet 40, i.e. so as to maintain a constant spacing between the end 41 and the plasma generator 26. Solidified particles fall to the bottom of the compartment 20 and proceed through the opening 28 to the container 39.

The opposite end of the billet 40, which cannot be melted, is pushed by the pusher 15 through the opening 22 into the compartment 20. If this operation is hindered by the plasma generator 26, the latter is withdrawn by the mechanism 28.

The pressure roller is then lifted, and the pusher 15 is withdrawn to its rearmost position. Another billet 40 from the magazine 3 is placed on the rolls 5, and the above sequence of events is repeated. During a change of billets the plasma generator 26 is switched off to avoid heating of the mechanisms in the compartment 2 by the plasma jet 42 coming through the opening 22.

The apparatus described above and illustrated in FIGS. 1, 2, 5 and 6 is characterized in that the generator 26 and lid 25 are angularly positioned with respect to the billet 40 at an angle $\alpha$ of 70° (FIG. 5) to 110° (FIG. 6) to the axis 90 of the billet 40. As a result, the heat-affected zone moves away from the axis of the billet 40, which provides for a more uniform distribution of the thermal flux of the plasma jet 42 over the end face of the end 41 of the billet 40.

When the plasma jet 42 is directed straight at the center of the end face of the billet 40, the central part of the billet 40 is melted away, whereas the peripheral part of the billet 40 remains unmelted and disintegrates into large-size lumps. However, when the plasma jet 42 is moved towards the periphery of the rotating billet 40, its end 41 becomes tapered; as a result, the peripheral speed of molten metal is reduced with a reduction in the billet's radius, which accounts for the formation of granules of different sizes; large drops of molten metal may even fall from the end of the tapered billet. On the other hand, in the case of a relatively uniform distribution of the heat flux, the end face of the billet 40 is either flat or slightly concave. The molten metal at the end 41 of the billet 40 is then accelerated by the centrifugal forces to a speed equal to the peripheral speed of the billet 40; as a result, all the granules are formed under equal conditions, which accounts for the formation of 95 to 98 percent of granules of the same size. If the diameter of the billet is 2 to 5 times greater than that of the area of the heat-affected zone, the heat-affected zone must first be displaced with respect to the axis of the billet by $\frac{1}{8}$ to $\frac{3}{8}$ of the billet's diameter; the generator 26 remains stationary in the course of melting the billet. If the billet diameter is much greater (more than 4 or 5 times) than the diameter of the heat-affected zone, it is advisable that the generator 26 should be continuously displaced while the free end of the billet is being melted; for this purpose, the generator 26 may be swiveled in a ball joint which may be substituted for seal 27 shown in FIG. 1 through an angle of ±20° with respect to that position of said generator 26 at which it is coaxial with the billet.

In the case of the apparatus of FIGS. 1 and 2, it is only prior to operation that the generator 26 and lid 25 should be displaced along the rod 29 as may be required by changes in the diameter or chemical composition of the billet, which may call for a different distribution of the thermal flux over the end face of the billet 40. The apparatus of FIGS. 1 and 2 is easy in maintenance and is advantageous for processing large batches of identical billets.

In the proposed apparatus, the electric heat source is a low-temperature plasma generator which can form a jet of gas of practically any chemical composition, which jet can practically be heated to any desired temperature. Apart from maintaining the original chemical composition of the material, this feature also makes it possible to further act upon the material in a desired way; for example, one can combine the melting of materials with refining, reduction, alloying and other chemometallurgical operations. The low-temperature plasma generator is fit to melt any material no matter if it conducts electricity or not. Besides, the generator can operate at high pressures of 1 to 50 atm. This is a valuable feature, keeping in mind that an increased pressure in the melting chamber accounts for a high rate of crystallization, which improves the quality of granules and makes it possible to reduce the cross-sectional dimensions of the melting chamber. Of all low-temperature plasma generators, the indirect-action arc plasma generator is preferable, being the simplest and readily available. However, in some cases other types of low-temperature generators are preferable, for example, high-frequency generators which can operate in oxidizing media and can produce a plasma jet of a large cross-sectional area. There may be other embodiments of the proposed apparatus, apart from the one shown in FIGS. 1 and 2.

The guide rod 29 and lid 25 may be secured to the chamber 1 at an angle α of 70° to the axis of said chamber 1 (FIG. 5). This arrangement shown in FIG. 5 accounts for a better view of the end 41 of the billet 40 from the inspection window 34 (FIG. 1), as well as for further scattering of the thermal flux of the plasma jet 42.

When the plasma jet is at an angle to the billet 40, the resultant velocity component of the plasma jet is conducive to the transfer of heat from the heat-affected zone in the radial direction over the end face of the billet 40.

The granulation apparatus according to the invention can also operate in a semicontinuous mode. For this purpose, the apparatus is provided with airlock chambers mounted on the hatch 19 and over the opening 38 for the discharge of granules. In such cases it is advisable that the function of the magazine 3 should be performed by a set of interchangeable cassettes with billets installed there in advance.

According to tests, the apparatus in accordance with the invention can process billets with a diameter of 55 to 100 mm. Such diameters are 2 or 3 times greater than the diameters of billets processed in conventional apparatus, wherein the heater is stationary and coaxial with the rotating billet. A provision of a charging magazine helps to increase productivity several times. The apparatus of the present invention accounts for a better size and shape uniformity of granules; this, in turn, accounts for a higher percentage of good-quality granules, which may be as high as 95 to 98 percent of the total mass of molten material. The use of a plasmatron as a heat source helps to improve the purity of granules, which is in contrast with apparatus employing electric arc heating, where granules are contaminated with tungsten and graphite admixtures. The apparatus of the present invention makes it possible to produce powders of metals and alloys, as well as of nonmetallic materials, such as tungsten carbide; such powders consists of pure, sphere-shaped particles.

Figure 4:
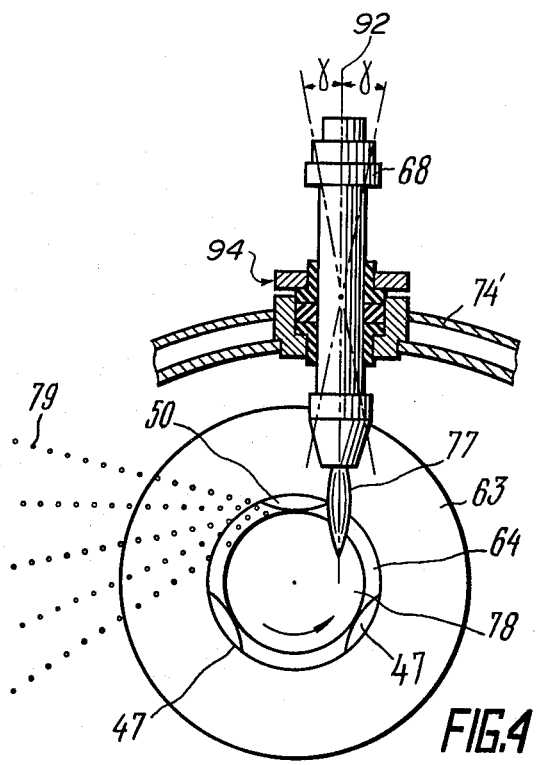
FIG. 4 is a section taken on line IV—IV of FIG. 3 and showing the mutual arrangement of the heat source and the opening for feeding the billet into the melting chamber.

According to another preferred embodiment, the proposed apparatus comprises a sealed cylindrical chamber 43 (FIGS. 3 and 4). The axis 90 of the chamber 43 extends horizontally. The chamber 43 has a charging compartment 44 accommodating a magazine 45 which may be a cassette to hold a batch of billets and feed them one by one to the chamber 43 for processing. Arranged under the magazine 45 is a billet rotating mechanism 46 composed of two rolls 47. The rolls 47 extend horizontally and parallel to each other and are installed in supports 48. The clearance between the rolls 47 is less than the billet diameter.

The rolls 47 are coupled to the drive 49 which rotates both rolls 47 at equal speeds and in the same direction. Arranged in the vertical plane between the rolls 47 (in the plane of FIG. 3) are a roller 50 intended to press the billet against the rolls 47, and a mechanism 51 for moving the billet in the longitudinal direction. The mechanism 51 comprises a drive screw 52 extending parallel with the rolls 47, as well as bearings 53, a pusher 54 and a drive 55. Mounted in the same plane on an axle 56, which is arranged below and at a perpendicular to the rolls 47, is a pusher 57 intended to remove the unmelted part of the billet. The charging compartment 44 also includes a vacuum line 58 with a check valve 59 intended to evacuate air from the chamber 43; the charging compartment 44 further includes an opening 60 for filling the chamber 43 with gas, a hatch 61 for placing billets in the magazine and other auxiliary systems (not shown) necessary for proper functioning of the mechanisms in the chamber 43.

A melting compartment 62 of the chamber 43 has water-cooled walls 74' and is separated from the charging compartment 44 by a water-cooled diaphragm 63 having an opening 64 for introducing a billet into the chamber 43. The diameter of the opening 64 is normally 1.02 to 1.08 of the billet diameter. A front wall 65 of the melting compartment 62 is provided with a hatch 66 covered with a detachable lid 67. The hatch 66 is used to clean the inside of the chamber 43 and replace the diaphragm 63. Mounted on the lid 67 is a heat source which is an indirect-action cylindrical arc plasma generator. As shown in FIG. 4 the generator 68 is introduced into the chamber 43 through a seal assembly 94 which permits a deviation of axis 92 about an angle $\gamma$ of $\pm 20°$. The plasma generator 68 is coupled to a mechanism 70 intended to set it in motion in the longitudinal direction.

In the upper part of the melting compartment 62 there is an opening 71 for the removal of excess gas from the chamber 43; in the lower part of the melting compartment 62 there is an opening 72 communicating with a detachable container 73 intended for accumulation of granules.

The plasma generator 68 is built into the conical wall 74 of the lid 67 at an angle $\theta$ of 20° to 70° to the axis of the opening 64, i.e., to the axis of the chamber 43. According to FIG. 3, the heat source 68 is an arc plasmatron constructed as a tube extending through the seal 69 at an angle $\theta$ of 45° to the axis of the opening 64. Provided in the narrowing portion of the conical wall 74, coaxially with the opening 64, is an inspection window 75. The front wall 65 has a concave cone-shaped surface 98 so as to reduce the volume of the sealed chamber 43.

The lid 67 is provided with a drive mechanism comprising a drive screw 71 mounted on the wall 65 and secured in supports 82, and a nut 83 secured to said lid 67. The drive screw 81 also acts as an axle around which the lid 67 pivots when the hatch 66 is opened.

The plasma generator 68 is displaced from the axis of the opening 64 by no more than $\frac{1}{3}$ of the diameter of said opening 64 (according to FIG. 4, the displacement is equal to $\frac{1}{4}$ of the diameter of the opening 64).

The apparatus according to the invention is further equipped with power sources (not shown), vacuum pumps (not shown), a system for the supply, purification and circulation of inert gas (not shown), automatic control units and other means which are necessary for normal functioning of the device, in FIGS. 3 and 4.

The granulation apparatus described above operates as follows.

Cylindrical billets 76 are placed through the hatch 61 in the magazine 3; one of the billets 76 is placed on the rolls 47; it is pressed by the roller 50 from above, whereas the pusher 54 pushes it from the rear.

By turning the screw 81, the generator 68 is displaced as desired with respect to the center of the opening 64, the value of that displacement being proportional to the diameter of the billet 76; the displacement is also dependent upon the cross-sectional area of the plasma jet 77, the physical properties of the billet material and some other parameters. The lid 67 is closed and the chamber 43 is evacuated through the line 58. The valve 59 is then closed and the chamber 43 is filled with an inert gas through the opening 60. The drives 49 and 55 are brought into play, and the billet 76 is introduced through the opening 64 into the melting compartment 62. The plasma generator 68 is switched on and its plasma jet 77 is directed at the end face 78 of the billet 76 to heat it to the melting point of the billet material.

The centrifugal forces resulting from the rotation of the billet 76 about its longitudinal axis tear the molten metal from the end face 78 of the billet 76, which molten metal is uniformly sprayed inside the melting compartment 62. The inert gas pressure in the chamber 43 is maintained at a level sufficient to ensure cooling and complete solidification of particles of molten metal in the course of their flight from the end face 78 of the billet 76 to the cylindrical wall of the chamber 43. The gas, which is continuously supplied to the chamber 43 with the plasma jet 77, is released through the opening 71. The speed of the mechanism 51 is selected so as to ensure uniform heating of the end face 78 of the billet 76, i.e. a constant spacing between said end face 78 and the generator 68. Solidified particles 79 fall to the bottom of the compartment 62 and through the opening 72 proceed to the container 73. The unmelted part of the billet 76 is pushed by the pusher 57 through the opening into the compartment 62. The pressure roller 50 is then lifted, the pusher 54 is brought to its rearmost position, another billet 76 from the magazine 45 is placed on the rolls 47, and the above sequence of events is repeated.

The apparatus under review features a more uniform distribution of the thermal flux produced by the heat source 68 over the end face 78 of the billet 76. This is due to the fact that the plasma jet 77 is directed at an angle $\theta$ of 20° to 70° to said end face 78 and by that said plasma jet 77 is displaced with respect to the axis of the rotating billet 76. As a result, it is possible to significantly increase the billet diameter and thus raise the output of the apparatus. It is advisable that the billet 76 should be rotated in the direction opposite to that of the plasma jet 77, as shown in FIG. 4. As a result, particles of molten material torn from the end face 78 are acted upon not only by the centrifugal forces, but also by the velocity head of the plasma jet 77. This makes it possible to produce smaller granules 79 or reduce the speed of rotation of the billet 76, which, in turn, makes it possible to simplify the billet rotating mechanism 46. For example, in conventional apparatus a billet with a diameter of 50 mm must be rotated at a speed of 12,000 to 18,000 rpm to produce granules with a diameter of 100 to 200 mu. The apparatus of this invention makes it possible to reduce the speed of rotation of the billet at least two-fold, while producing granules of the same size.

An important feature about the proposed apparatus is that it makes it possible to remove the unmelted part of the billet from the compartment 44 to the compartment 62 without interfering with the generator 68, and that it provides a good view of the end face 78 of the billet 76 from the inspection window 75. Apart from facilitating maintenance of the apparatus, this feature provides for a better control of some process parameters. It is possible, for example, to measure the temperature of the end face exposed to the plasma jet by using a pyrometer; it is possible to control the size, shape and location of the heat-affected zone, etc.

It is best to arrange the generator 68 at an angle $\theta$ of 20° to 70° to the axis of the opening 64. With an angle of less than 20°, no positive effect is produced, i.e. it is impossible to facilitate maintenance and increase output. With an angle of more than 70°, particles of molten material may reach the generator 68, which may interfere with operation of the apparatus.

The embodiment of FIGS. 3 and 4 is not the last embodiment of an apparatus in accordance with the invention, whereof various modifications will be apparent to those skilled in the art within the spirit and scope of the invention.

Figure 7:
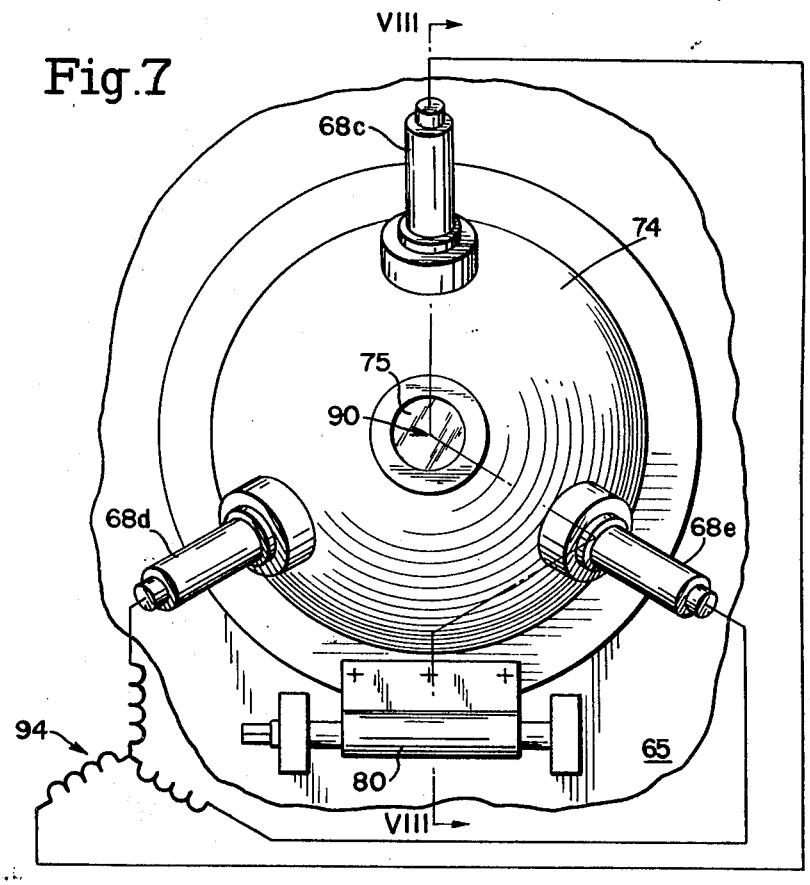
FIG. 7 is an end elevational view of the apparatus of FIG. 3, partly schematically shown, showing three heat sources in a star configuration and a three-phase AC source.
Figure 8:
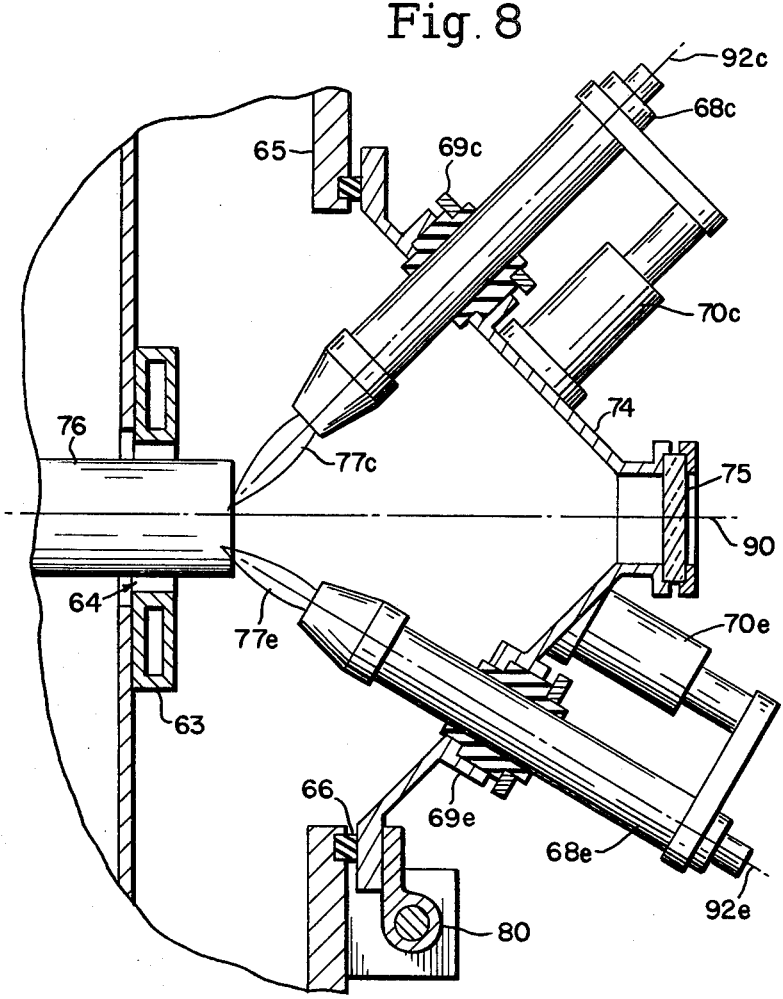
FIG. 8 is a sectional view, partly broken away for illustrative clarity, taken on the line VIII—VIII of FIG. 7.
Figure 9:
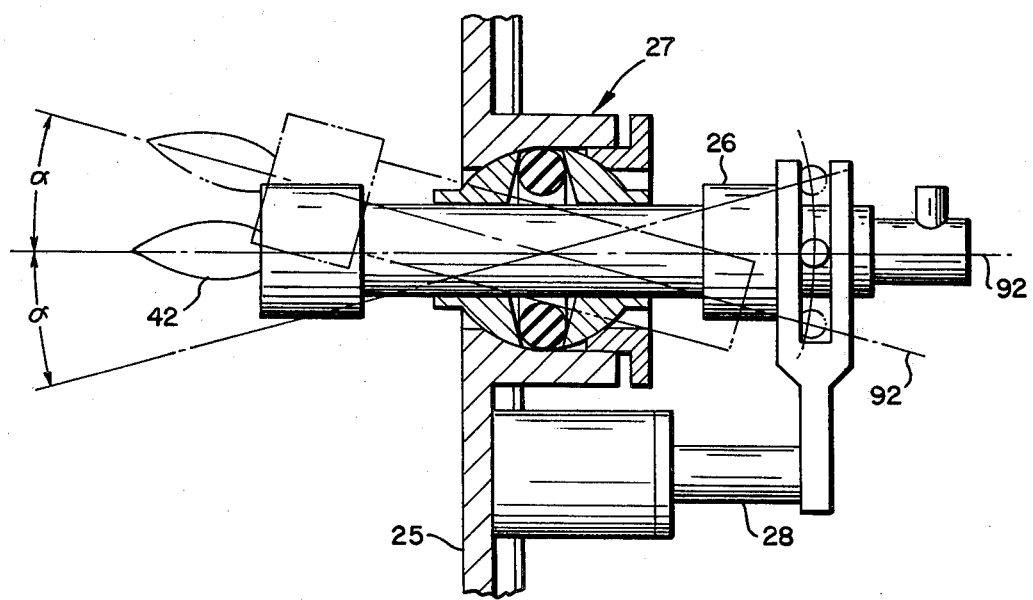

For example, when processing billets of very large diameters (200 to 400 mm and more), use should be made of a number of heat sources. As shown in FIGS. 7 and 8, one may use, for example, three direct-action arc plasma generators 68c, 68d, and 68e powered by a three-phase alternating current source 94 so that the billet is a common zero point of the three star-connected plasma arcs. Each of the three generators should be displaced to a different degree from the axis of the opening for introducing the billet into the melting chamber. Keeping in mind the great mass of each billet, it may be practicable to dispense with the charging magazine and process billets one by one. In such a case it is preferable that the billet rotating mechanism should be constructed as a vertical spindle with a billet clamping chuck.

The apparatus in accordance with the invention makes it possible to handle billets with diameters that are 3 to 4 times greater than the diameters of billets processed in conventional apparatus; this accounts for a two- to three-fold increase in the outut, while maintaining the same dimensions, uniformity and chemical composition of the granules. In addition, the proposed apparatus is much simpler to maintain than conventional apparatus, and provides for a better control of process parameters.

While particular embodiments of the present invention have been shown and described, various modifications thereof will be apparent to those skilled in the art and therefore it is not intended that the invention should be limited to the disclosed embodiments or to the details thereof and the departures may be made therefrom within the spirit and scope of the invention as defined in the claims.

What is claimed is:

1. An apparatus for producing powdered or granular particles comprising: a sealed chamber with a lid in the form of a conical funnel expanding toward said chamber, a concentrated heat source having an axis arranged on an inclined lateral wall of said conical lid on one side of said chamber, means for feeding and rotating the end of a billet which enters the chamber through an opening in the opposite side of said chamber from said lid into contact with said heat source whereby the end of the billet is melted and the molten material is removed from the billet by centrifugal force in the form of small droplets which are solidified in the chamber and wherein the axis of said heat source is displaced from the axis of the billet.

2. The apparatus of claim 1 wherein the concentrated heat source is a plasma generator.

3. The apparatus of claim 1 wherein a sight glass is arranged at the apex of the conical lid and the conical lid is arranged coaxially with the axis of said rotating billet.

4. The apparatus of claim 1 wherein the concentrated heat source is arranged on the lateral surface of said lid so that the axis of the concentrated heat source makes an angle $\theta$ with the axis of the billet, between about 20° and 70°.

5. The apparatus of claim 2 wherein the concentrated heat source is arranged on the lateral surface of said lid so that the axis of the concentrated heat source makes an angle $\theta$, with the axis of the billet, between about 20° and 70°.

6. An apparatus for producing powdered or granular particles comprising: a sealed chamber with a lid having a concentrated heat source having an axis arranged on said lid on one side of said chamber, means for feeding and rotating the end of a billet which enters the chamber through an opening in the opposite side of said chamber from said lid into contact with said heat source whereby the end of the billet is melted and the molten material is removed from the billet by centrifugal force in the form of small droplets which are solidified in the chamber and wherein the axis of said heat source is displaced from the axis of the billet, said lid being arranged so that the lid can be moved along an axis which makes an angle $\alpha$ with the axis of the billet whereby the displacement of the axis of the heat source in relation to the axis of the billet can be changed.

7. The apparatus of claim 6, wherein the angle $\gamma$ is from about 70° to 110°.

8. An apparatus for producing powdered or granular particles comprising: a sealed chamber with a lid having a concentrated heat source having an axis arranged on said lid on one side of said chamber, means for feeding and rotating the end of a billet which enters the chamber through an opening in the opposite side of said chamber from said lid into contact with said heat source whereby the end of the billet is melted and the molten material is removed from the billet by centrifugal force in the form of small droplets which are solidified in the chamber and wherein the axis of said heat source is displaced from the axis of the billet, said heat source being arranged on said lid by swivel means whereby the axis of the heat source can be varied through an angle $\gamma$ in relation to the axis of said billet.

9. The apparatus of claim 8 wherein the angle $\gamma$ is $\pm 20°$ in relation to the axis of the billet.

10. An apparatus for producing powdered or granular particles comprising: a sealed chamber with a lid having at least two concentrated heat sources having an axis arranged on said lid on one side of said chamber, means for feeding and rotating the end of a billet which enters the chamber through an opening in the opposite side of said chamber from said lid into contact with said heat source whereby the end of the billet is melted and the molten material is removed from the billet by centrifugal force in the form of small droplets which are solidified in the chamber and wherein the axis of said heat source is displaced from the axis of the billet, said at least two concentrated heat sources being arranged so that the axes of said at least two heat sources are displaced from the axis of the billet.

11. The apparatus of claim 10 wherein the heat sources comprise three plasma generators.

12. The apparatus of claim 11 wherein the concentrated heat source comprises three direct action arc plasmatrons connected in a star configuration to a three phase A.C. current supply so that the billet is a neutral point.

13. An apparatus for producing powdered or granular particles comprising: a sealed chamber with a lid having a concentrated heat source which comprises a high frequency induction plasma torch having an axis arranged on said lid on one side of said chamber, means for feeding and rotating the end of a billet which enters the chamber through an opening in the opposite side of said chamber from said lid into contact with said heat source whereby the end of the billet is melted and the molten material is removed from the billet by centrifugal force in the form of small droplets which are solidified in the chamber and wherein the axis of said heat source is displaced from the axis of the billet.

* * * * *